United States Patent Office 3,504,547
Patented Apr. 7, 1970

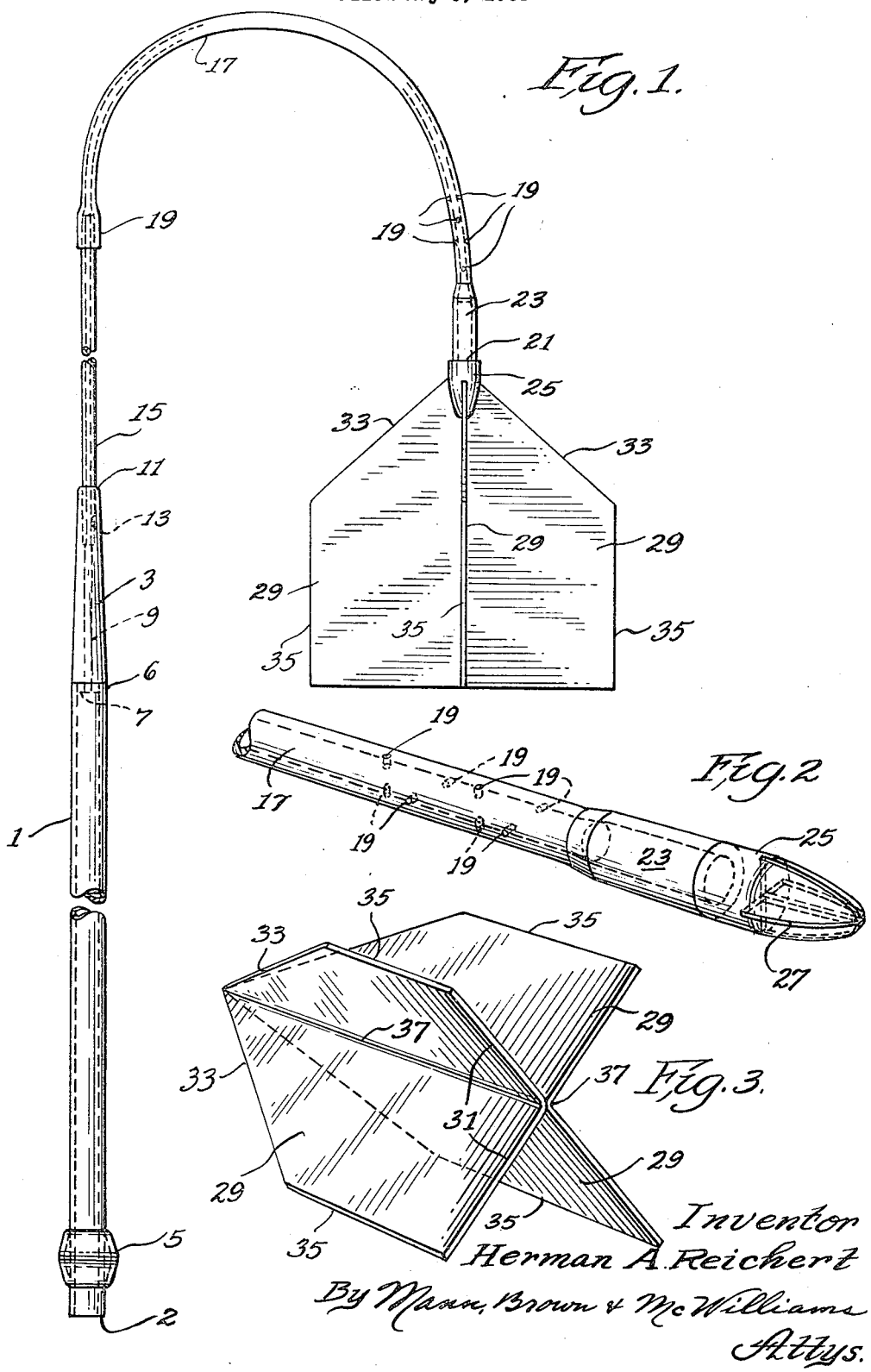

3,504,547
STATIC PRESSURE SENSING DEVICE
Herman A. Reichert, Michigan City, Ind., assignor to
W. F. Dwyer Mfg. Co., Inc., a corporation of Indiana
Filed May 9, 1968, Ser. No. 727,882
Int. Cl. G01l 19/00
U.S. Cl. 73—388                                    5 Claims

ABSTRACT OF THE DISCLOSURE

Static pressure in a flowing gas stream can be more accurately measured by attaching a universal point connection member such as a piece of thin flexible tubing having small, clean, burr-free holes adjacent its free end to act as pressure sensing pickup points, to the end of a piece of rigid tubing, fastening to the free end of the flexible tubing, vanes, fins or other device which will cause the free flexible tubing end to trail out and align itself with the gas stream, and inserting the flexible tubing into the duct in which gas pressure is to be measured. Inaccurate signals which are caused by turbulence are thereby eliminated.

BRIEF SUMMARY OF THE INVENTION

Static pressure sensors currently in use, generally consist of a straight tube or a bent tube type pickup inserted in a duct through which a current of air or other gas is flowing. The devices now in use are direction-sensitive and tend to give somewhat inaccurate signals when turbulent flow conditions are encountered. In order to try to avoid this drawback, such devices are placed as far as possible from elbows, obstructions, or locations of duct-size expansion or contraction to eliminate as far as possible the turbulence caused by these factors. The difficulty, however, is that under practical conditions met with, the duct system contains air filters, air conditioning units, and/or coils and it is usually not possible to find a point sufficiently spaced from such obstruction to get an accurate reading.

It is one of the objects of the present invention to provide a static pressure sensitive device which eliminates the inaccuracies caused by turbulence, as well as by meandering or angular flow within the duct. Another object of the invention is to provide a static pressure sensitive device which is able to align itself with the true gas flow direction at the point where the reading is taken.

The aforesaid objectives are accomplished by providing a universal joint connection member, such as a flexible tube element, with the sensing point adjacent the end thereof and with vanes or other means responsive to the direction of gas flow attached to the end of the member so that the gas stream, by virtue of its effect on such means, aligns the sensing point of the member with the gas flow.

BRIEF DESCRIPTION OF THE SEVERAL VIEWS OF THE DRAWING

FIGURE 1 is an elevational view of a static pressure sensing device constructed in accordance with my invention;

FIGURE 2 is an enlarged perspective view showing the end of a flexible tubing and vane connector forming part of the sensing device; and FIGURE 3 is an enlarged perspective view of vanes forming part of the sensing device.

DETAILED DESCRIPTION

Referring to the drawing, the numeral 1 indicates an elongated, narrow, rigid tube made of metal such as brass or other suitable material such as plastic. The tube 1 may be of any suitable length so that it may be held by hand or mounted in a fixed position. A suitable length for the tubing 1 is 24 inches. Although the length and diameter of the tubing 1 is not critical, I have found that a tubing having an outside diameter of approximately 3/16 inch and an inside diameter of approximately 1/8 inch gives good results. The pipe 1 is provided near end 2 with a ferrule 5 to enable it to be connected to a pressure gauge or other read-out device by means of rubber or other flexible tubing.

A tapered transition piece 3 is fastened to the end 6 of tubing 1 in leak-proof relation therewith. One method of fitting taper piece 3 to tubing 1 is by providing tapered piece 3 with an extension 7 of reduced diameter, the outer wall of which is accurately machined to fit tightly within the upper end 6 of tube 1. Piece 3 has a narrow passageway 9 therethrough having a diameter of the order of 1/32 inch.

The upper end 11 of pipe 3 is counterbored or formed with an enlarged bore as shown at 13 to snugly receive one end of tube 15, which may have an outside diameter of 1/16 inch and an inside diameter of approximately 1/32 inch. The tube 15 is of sufficient length to permit it to be inserted in the air or other gas duct with the end of the tube approximately in the center of the duct thereby providing space for the end of the device to freely align itself in the gas flow. One end of tube 15 fits tightly within the counterbored portion 13 of piece 3 so as to form a leak-proof joint.

Tubing 15 should be as narrow as possible in order to reduce obstruction to gas flow to the minimum. It is desirable when using the device, not to insert it beyond the end 11 of the transition piece.

Fastened to the other end of tube 15 is a universal joint connection member, preferably a piece of flexible tubing 17 which is preferably made of plastic, such as vinyl, capable of withstanding the temperature conditions to which it is subjected in the gas duct, and also chemically resistant to the particular gases to which it is subjected. I prefer to use tubing having an inside diameter of 1/32 inch and an outside diameter of 1/16 inch. Transparent plastic material will permit visual inspection to determine whether or not the passageway is plugged. The end 19 of tubing 17 fits over the outer end of tubing 15. The other end of tubing 17 has a series of small, clean, burr-free holes 19 punched or drilled therethrough. Preferably the holes are drilled or punched at an angle of 90 degrees with respect to the holes immediately laterally adjacent thereto. The holes 19 may have a diameter of approximately .02 inch and be spaced along the tubing at a distance of about 1/16 inch. As shown in the drawing there are four sets of spaced holes. It will be understood that more or less than four sets may be drilled or punched in the tubing. The holes 19 are arranged or positioned so that when the flexible tubing end is inserted in a gas stream the hole openings on the outside of the tube will be susbtantially normal to the direction of gas flow.

It is important that the holes 19 be clean and burr-free in order to avoid surface turbulence and consequence ramming or aspiration of the gas enclosed within the tube and universal joint connection member, which, if they occurred, would severely limit the usefulness of the device.

The end set of holes 19 are spaced approximately 1/2 inch from the end 21 of tubing 17 in order to allow sufficient room for the insertion of the end 23 of vane connector 25. End 23 is solid and closes the end of the tubing 17. The outer end of connector 25 is formed with spaced slots 27. In the connector shown in the drawing there are two cross slots at right angles to each other in order to enable four vanes 29 to be inserted therein and held thereby. It will be understood that the slots may be spaced other than as above described and that more or less than four vanes may be used. Vanes 29 may be made of plastic, aluminum or other light material which has sufficient rigidity so as not to bend in the gas stream. I prefer to use a plastic material because of its lightness, thereby enabling the end of the flexible tubing containing the sensing ports 19 to be readily aligned in the gas stream.

The relation of the length of the tubing 15 and the flexible tubing 17 should be such that when the entire tube length 15 is inserted in an air or other gas duct the vanes will not drag against the wall of the gas duct and prevent alignment with the gas flow. I have found that if this relation is such that, when the tube 1 is held in an upright direction, the end 21 does not extend below the upper end 11 of transition piece 3, this difficulty is avoided. For example, if the tube 15 is two inches in length, the free flexing portion of tubing 17 should be about three inches in length. The aforesaid lengths will provide sufficient length to allow the tubing 17 to readily align itself in the gas stream in duct sizes generally encountered while avoiding the problem of having too great length so that the vanes drag or strike against the side walls of the duct.

As shown in FIGURE 3, the vanes are formed by taking two pieces of plastic having a width of about 1½ inches and bending each at right angles so that each piece forms two vanes 31. The edge 33 which is inserted in the slots of the vane connector is preferably tapered. The length of the outside edge 35 is about ⅞ inch and the length along the center crease 37 is about 1½ inches. Four vanes at right angles to each other of the aforesaid size have been found to perform satisfactorily. It will be understood, however, that vanes of different shapes and sizes may be used provided they are capable of being picked up by the air or gas stream so as to allow the end of the tubing 17 containing the holes 19 to be aligned in the stream.

The manner of using the sensing device is simple. The end 3 is fastened by a flexible coupling to a read-out device such as a manometer or other sensitive pressure gauging device and the end of the device containing the vane 29 is inserted into the gas duct through a hole or other opening to approximately the end 11 of the transition piece 3. By virtue of the vanes on the end of the tubing, the end of tubing 17 will be picked up and align itself with the through-air flow direction at the point where the pressure is being read and thereby eliminate the inaccuracies caused by turbulence, meandering or angular flow.

I claim:
1. A static pressure sensing device for use in a flowing gas stream comprising, when vertically oriented, a straight vertically oriented rigid narrow elongated tube having upper and lower open ends, the lower end of which is adapted to be connected to a pressure indicating device, the upper end of which is formed with a length of reduced cross-section, a flexible tube attached to one end to the end of said length of reduced cross-section and vanes attached to the other end of said flexible tube, characterized in said said flexible tube, when the device encounters a no-flow condition, is sufficiently flexible to allow said flexible tube to bend so as to enable a portion of said flexible tube to lie substantially parallel to the reduced cross-section length of said rigid tube, the relative lengths of said flexible tube and said reduced cross-sectional length being such that said portion of said flexible tube does not extend below said length of reduced cross-section, said resilient tube having gas-admitting holes adjacent the end to which the vanes are attached.

2. A static pressure sensing device in accordance with claim 1, in which said gas-admitting holes are a plurality of small, clean and burr-free openings passing through the wall of said flexible tube at an angle perpendicular to the axis of the tube at the location of said holes, said holes being angularly displaced relative to each laterally adjacent hole.

3. A static pressure sensing device in accordance with claim 2, wherein said vanes have tapered and sloping edge portions adjacent said other end of said flexible tube.

4. A static pressure sensing device in accordance with claim 3, wherein said vanes are attached to the other end of said flexible tube by means of an intermediate insertable vane connecter, the outer end of said connector being slotted.

5. A static pressure sensing device in accordance with claim 4, wherein said vanes are formed by one-piece members having adjacent side wall portions, spaced about 90° apart and said one-piece members are inserted into the slots of said vane connector.

References Cited

UNITED STATES PATENTS 2,554,634    5/1951    Paine et al.      73—212
3,347,095    10/1967    Strong et al.      73—212

DONALD O. WOODIEL, Primary Examiner

PO-1050
(5/69)

UNITED STATES PATENT OFFICE
CERTIFICATE OF CORRECTION

Patent No. 3,504,547          Dated April 7, 1970

Inventor(s) Herman A. Reichert

It is certified that error appears in the above-identified patent and that said Letters Patent are hereby corrected as shown below:

Column 1, line 3, for "W. F. Dwyer Mfg. Co., Inc.," read -- Dwyer Instruments, Inc. --.
Column 4, line 3, after "straight" insert -- , --; same column 4, line 8, for "to" read -- at --; same column 4, line 11, for "said said" read -- that said --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents